(12) United States Patent
Cash et al.

(10) Patent No.: US 10,307,785 B2
(45) Date of Patent: Jun. 4, 2019

(54) HEAT PUMP DISPENSER

(71) Applicant: RPM Wood Finishes Group, Inc., Hickory, NC (US)

(72) Inventors: Steve Cash, Matthews, NC (US); Colin Campbell, Charlotte, NC (US); Marc Vitantonio, South Russell, OH (US); Robert Vystrcil, Garrettsville, OH (US); Trevor Jackson, Kirtland, OH (US); Chris deHaas, Madison, OH (US); Robert Soreo, Cleveland Heights, OH (US)

(73) Assignee: RPM WOOD FINISHES GROUP, INC., Hickory, NC (US)

( * ) Notice: Subject to any disclaimer, the term of this patent is extended or adjusted under 35 U.S.C. 154(b) by 55 days.

(21) Appl. No.: 15/596,087

(22) Filed: May 16, 2017

(65) Prior Publication Data

US 2017/0341103 A1    Nov. 30, 2017

Related U.S. Application Data

(60) Provisional application No. 62/340,573, filed on May 24, 2016, provisional application No. 62/340,581, filed on May 24, 2016.

(51) Int. Cl.
   *B05C 17/005*    (2006.01)
   *B05C 17/01*    (2006.01)
   (Continued)

(52) U.S. Cl.
   CPC .... *B05C 17/0053* (2013.01); *B05C 17/00533* (2013.01); *B05C 17/0126* (2013.01); *B27G 11/005* (2013.01); *F16N 5/00* (2013.01)

(58) Field of Classification Search
   CPC ... B65D 83/0022; B65D 83/0033; F16N 3/12; F16N 5/00; G01F 11/026; Y10T 74/1553;
   (Continued)

(56) References Cited

U.S. PATENT DOCUMENTS

| 1,718,596 A | * | 6/1929 | Smith | ............. | A61M 5/24 |
| | | | | | 222/391 |
| 1,769,437 A | | 7/1930 | Kromer, Jr. | | |

(Continued)

FOREIGN PATENT DOCUMENTS

WO    82/03761    11/1982

OTHER PUBLICATIONS

European Search Report filed in EP 17 17 2627 dated Nov. 14, 2017.

*Primary Examiner* — Paul R Durand
*Assistant Examiner* — Andrew P Bainbridge
(74) *Attorney, Agent, or Firm* — Rankin, Hill & Clark LLP

(57) ABSTRACT

A heat pump dispenser includes a housing having a handle portion and a barrel portion. A feeder section is coupled to the handle portion. The feeder section includes a feeder mechanism and a dispensing trigger assembly operably coupled to the feeder mechanism. The feeder mechanism includes a gear assembly having a drive gear operably engaged to a plunger housed in the barrel portion. The trigger assembly includes a trigger having a ratchet portion. The ratchet portion selectively engages and rotates the drive gear to move the plunger toward a dispensing opening provided in the barrel portion and into engagement with an adhesive/filler stick. The feeder mechanism is selectively actuated by the dispensing trigger assembly to advance the adhesive/filler stick into a heater section of the barrel portion.

17 Claims, 15 Drawing Sheets

(51) Int. Cl.
*B27G 11/00* (2006.01)
*F16N 5/00* (2006.01)

(58) Field of Classification Search
CPC ... Y10T 74/1598; B05B 11/025; B05B 17/01; B05B 17/012; B05B 17/0123; B05B 17/0053; B05B 17/00533; B05B 17/00546; B05B 17/00596; B05B 17/0116; B05B 17/0126; B27G 11/005; B05C 17/0053; B05C 17/00533; B05C 17/0126
USPC ...................................... 222/146.2, 333, 391
See application file for complete search history.

(56) References Cited

U.S. PATENT DOCUMENTS

| | | | |
|---|---|---|---|
| 2,175,601 A | | 10/1939 | Grund |
| 3,189,226 A | * | 6/1965 | Sherbondy .......... B05C 17/0123 222/327 |
| 3,570,742 A | | 3/1971 | Graham |
| 3,612,357 A | | 10/1971 | Ruskin |
| 3,743,142 A | * | 7/1973 | Elliott ................. B05C 17/0053 222/146.5 |
| 3,774,819 A | * | 11/1973 | Bratton ................. B05C 17/005 206/384 |
| 4,065,034 A | * | 12/1977 | Callan .................... B05C 3/132 219/230 |
| 4,273,269 A | * | 6/1981 | Davis, Jr. ............. B05C 17/012 222/326 |
| 4,667,084 A | | 5/1987 | Regge |
| 4,781,482 A | * | 11/1988 | Ursprung ............ B05C 17/0053 219/229 |
| 4,852,488 A | | 8/1989 | Abendroth et al. |
| 4,865,231 A | * | 9/1989 | Wiercinski ............. A45D 40/04 222/390 |
| 5,000,356 A | * | 3/1991 | Johnson ................. A45D 40/04 222/340 |
| 5,026,187 A | | 6/1991 | Belanger |
| 5,295,614 A | * | 3/1994 | Chang .................... B05C 17/01 222/137 |
| 5,375,740 A | * | 12/1994 | Umetsu ................ A23G 3/2023 222/327 |
| 5,664,701 A | * | 9/1997 | Massena .......... B05C 17/00526 219/227 |
| 5,713,864 A | | 2/1998 | Verkaart |
| 5,775,539 A | * | 7/1998 | Bates .................. B05C 17/0103 222/1 |
| 5,782,633 A | | 7/1998 | Muhlbauer |
| 5,879,633 A | | 3/1999 | Tervamaki |
| 5,881,923 A | | 3/1999 | Bokros |
| 6,170,709 B1 | * | 1/2001 | Huang ............. B05C 17/00523 222/146.5 |
| 6,575,340 B2 | | 6/2003 | Steinel |
| 7,086,861 B2 | | 8/2006 | Pitz |
| 8,297,481 B2 | * | 10/2012 | Jalali ....................... A23G 3/28 222/182 |
| 8,740,021 B2 | * | 6/2014 | Naughton ............... G01F 11/00 192/54.5 |
| 8,783,526 B2 | | 7/2014 | Strobel-Schmidt |
| 2002/0086264 A1 | | 7/2002 | Okawa et al. |
| 2005/0209821 A1 | | 9/2005 | Nguyen et al. |
| 2005/0241421 A1 | | 11/2005 | Guerin-Schmitt |
| 2012/0248152 A1 | | 10/2012 | Weill |
| 2015/0209821 A1 | * | 7/2015 | Pfahnl ................. A61M 1/0064 222/1 |
| 2017/0341103 A1 | * | 11/2017 | Cash ................... B05C 17/0053 |
| 2018/0078967 A1 | * | 3/2018 | Turner ............. B05C 17/00553 |

* cited by examiner

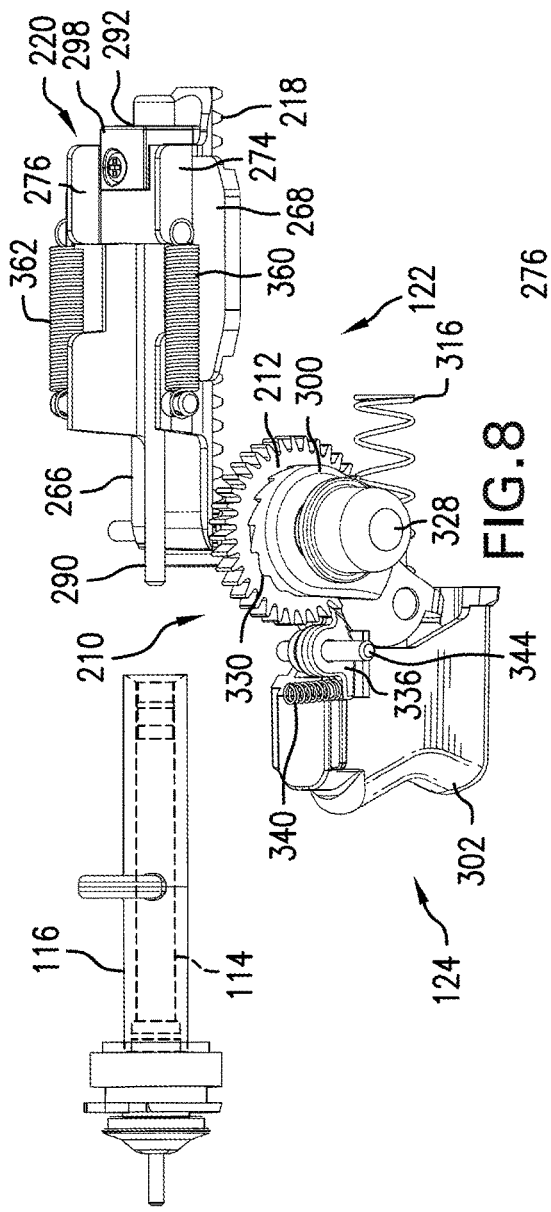
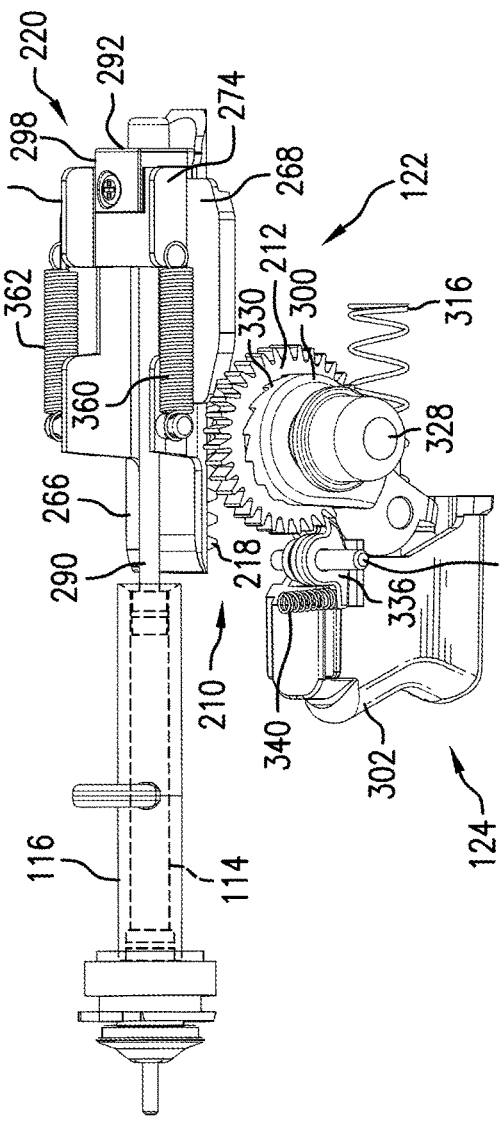

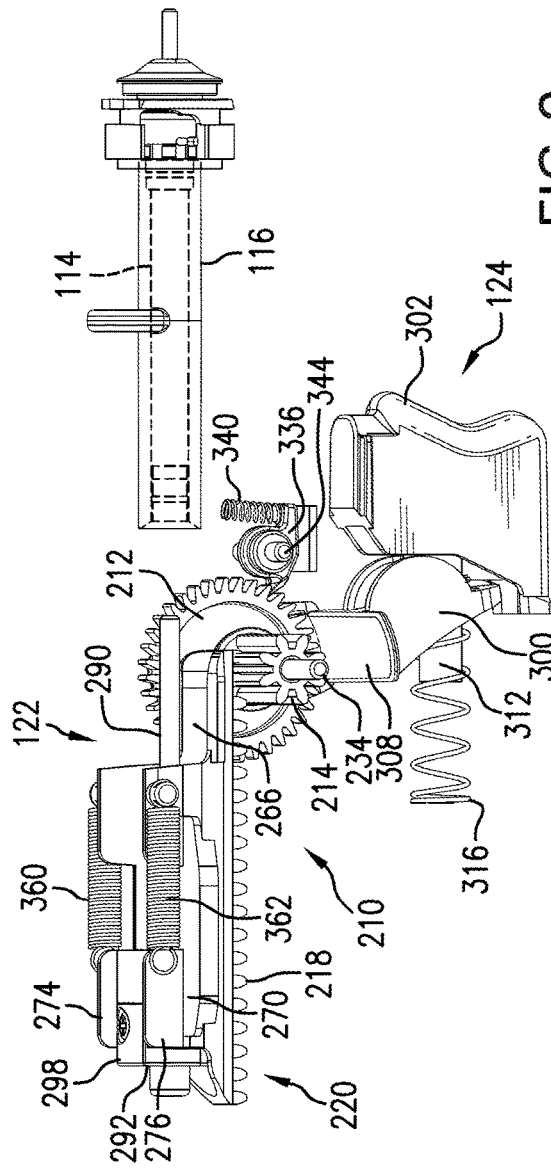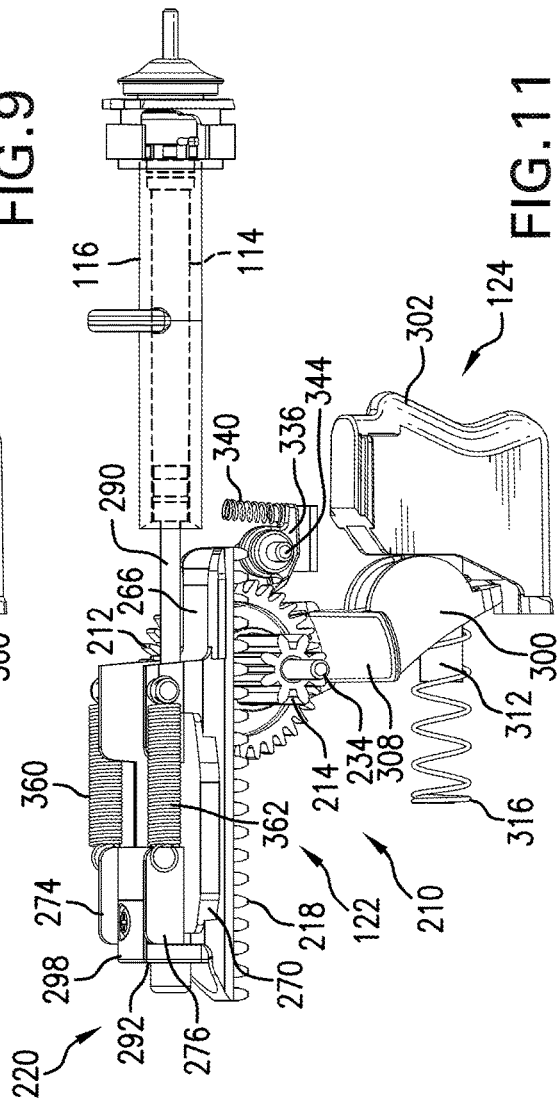

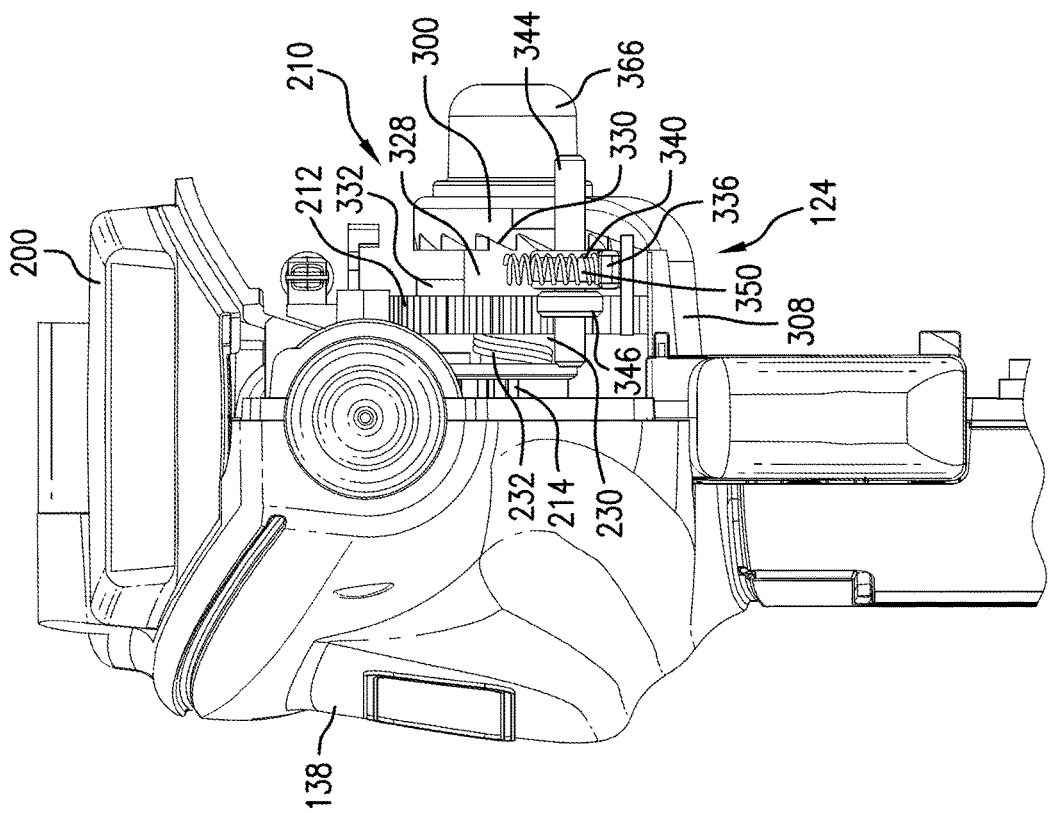
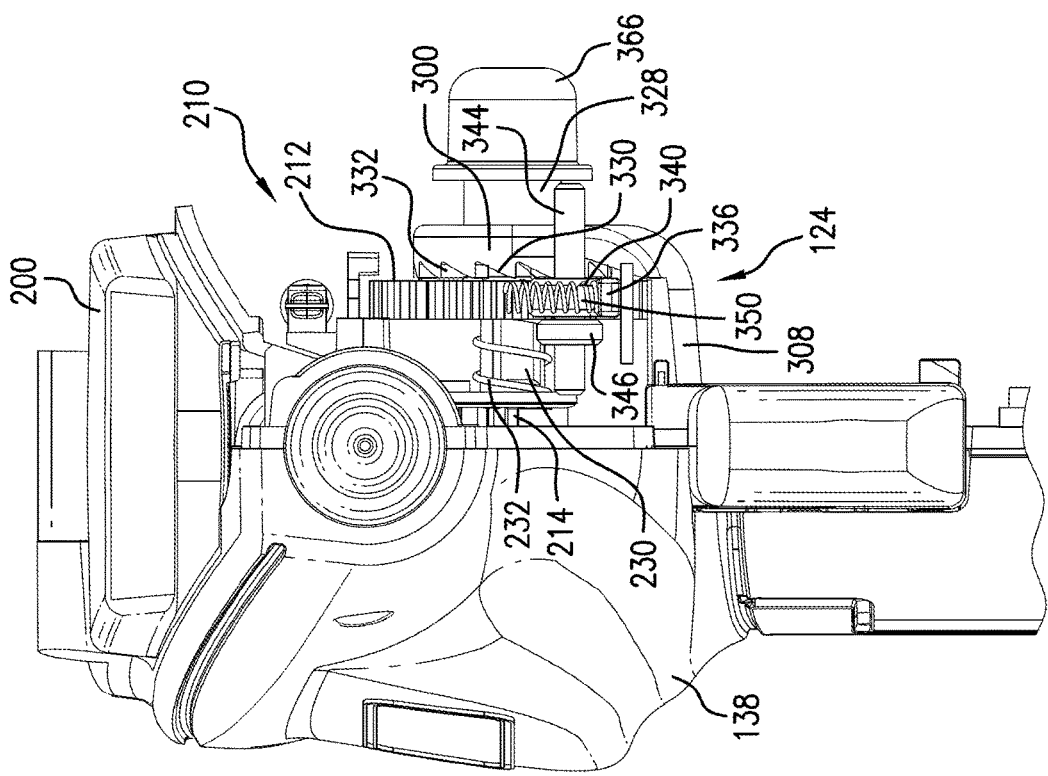

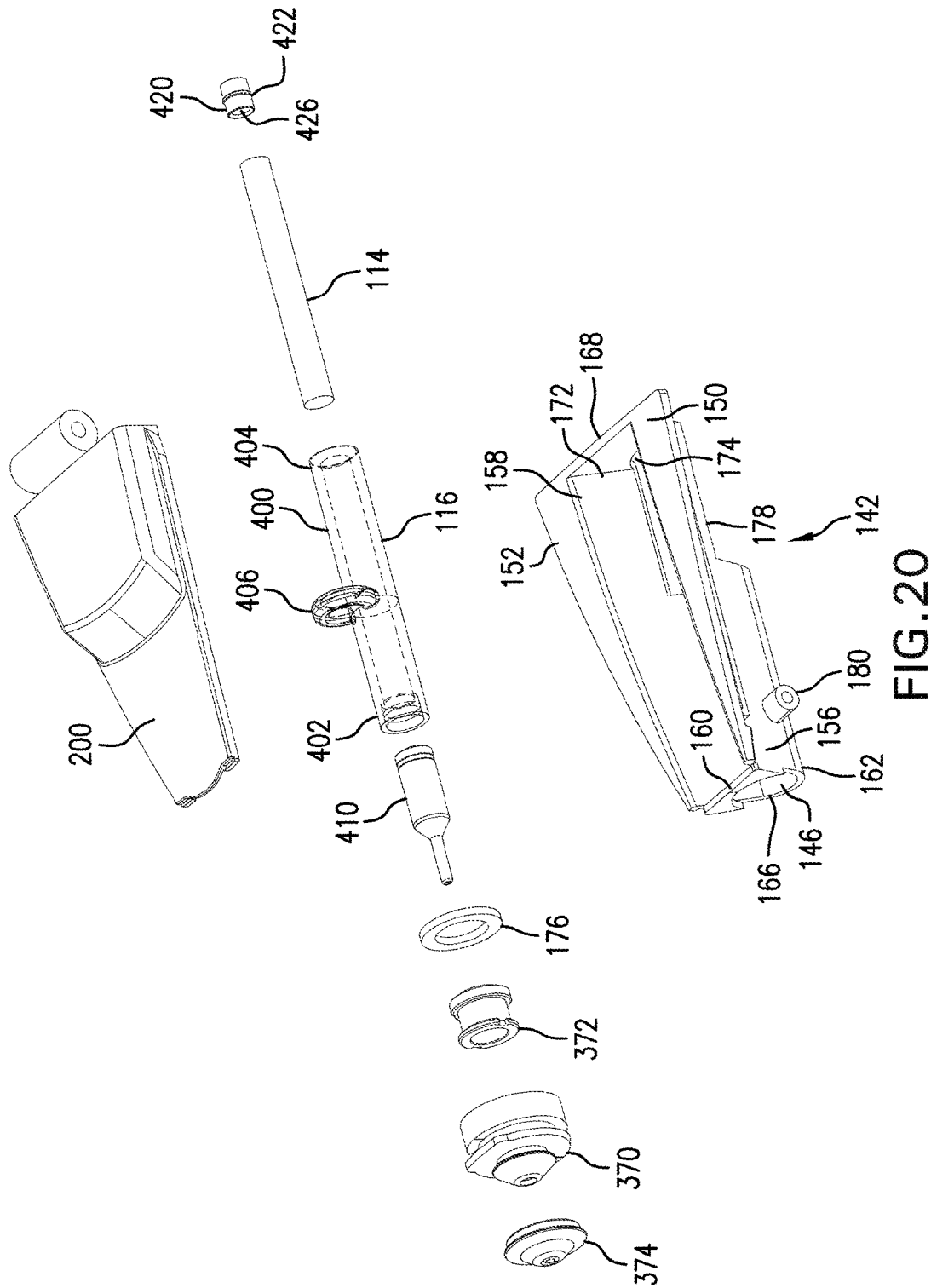

HEAT PUMP DISPENSER

BACKGROUND

Heat pump dispensers are popular devices for dispensing, for example, hot glues for use as an adhesive and/or fillers for wood repair. The heat pump dispensers generally comprise a heater section which is mounted to a dispenser section. The heater section typically includes resistive heating elements which are heated to elevated temperatures for melting an adhesive/filler stick provided in a removable cartridge. The dispenser section typically includes an adhesive/filler feeder assembly and a pistol grip handle.

SUMMARY

According to one aspect, a heat pump dispenser comprises a housing having a handle portion and a barrel portion. A feeder section is coupled to the handle portion. The feeder section includes a feeder mechanism and a dispensing trigger assembly operably coupled to the feeder mechanism. The feeder mechanism includes a gear assembly having a drive gear operably engaged to a plunger housed in the barrel portion. The trigger assembly includes a trigger having a ratchet portion. The ratchet portion selectively engages and rotates the drive gear to move the plunger toward a dispensing opening provided in the barrel portion and into engagement with an adhesive/filler stick. The feeder mechanism is selectively actuated by the dispensing trigger assembly to advance the adhesive/filler stick into a heater section of the barrel portion.

According to another aspect, a heat pump dispenser comprises a housing having a handle portion and a barrel portion. A feeder section is coupled to the handle portion. The feeder section includes a feeder mechanism and a dispensing trigger assembly operably coupled to the feeder mechanism. The feeder mechanism includes a gear assembly having a drive gear operably engaged to a linear gear provided as part of a plunger housed in the barrel portion. The trigger assembly includes a trigger having a ratchet portion and the drive gear is biased toward the ratchet portion. An outer side of the drive gear includes at least one projection. The ratchet portion includes teeth which selectively engage the at least one projection to rotate the drive gear which moves the plunger toward a dispensing opening provided in the barrel portion and into engagement with an adhesive/filler stick. The feeder mechanism is selectively actuated by the dispensing trigger assembly to advance the adhesive/filler stick into a heater section of the barrel portion.

According to another aspect, a heat pump dispenser comprises a handle portion and a barrel portion. The handle portion includes a feeder section and the barrel portion includes a heater section for heating and then dispensing a melted end of an adhesive/filler stick provided in a removable cartridge. The feeder section includes a feeder mechanism that may be selectively actuated by a dispensing trigger assembly to advance the adhesive/filler stick into the heater section. The feeder mechanism includes a gear assembly having a drive gear, a rack drive gear, an idle gear, a rack drive slave gear and a plunger having a linear gear or rack. The trigger assembly includes a trigger and a trigger button. The trigger includes a mounting portion and a ratchet portion extending outwardly from the mounting portion, the ratchet portion engaging the drive gear.

According to another aspect, a cartridge for a heat pump dispenser comprises a tubular shaped body having first and second opposite end portions. A tab for handling of the cartridge extends outwardly from an outer surface of the body. A heater tube formed of a heat conductive material is sized to be at least partially received in the first end portion. An adhesive/filler stick is received in a body, and a portion of the adhesive/filler stick is located in the heater tube. An inner surface of the heater tube defines a step adapted to engage the adhesive/filler stick. The step together with the adhesive/filler stick defines a reservoir in the heater tube forward of the adhesive/filler stick for receiving melted adhesive/filler.

BRIEF DESCRIPTION OF THE DRAWINGS

FIG. 4 depicts a feeder mechanism in a first position and FIG. 5 depicts the feeder mechanism in a second position engaging an adhesive/filler stick.

FIGS. 8 and 9 are perspective views of the feeder mechanism in the first position together with a trigger assembly of the heat pump dispenser and an exemplary heat pump cartridge containing the adhesive/filler stick.

FIGS. 10 and 11 are perspective views of the feeder mechanism in the second position together with the trigger assembly and the heat pump cartridge.

FIG. 13 is a perspective view of the trigger engaged to the drive gear, and a lock of the of the heat pump dispenser also engaged to the drive gear.

FIG. 14 is a perspective view of the trigger and the lock disengaged from the drive gear.

FIG. 20 is an exploded perspective view of components of a heater section of the heat pump dispenser including parts of the heat pump cartridge.

DETAILED DESCRIPTION

Figure 15:
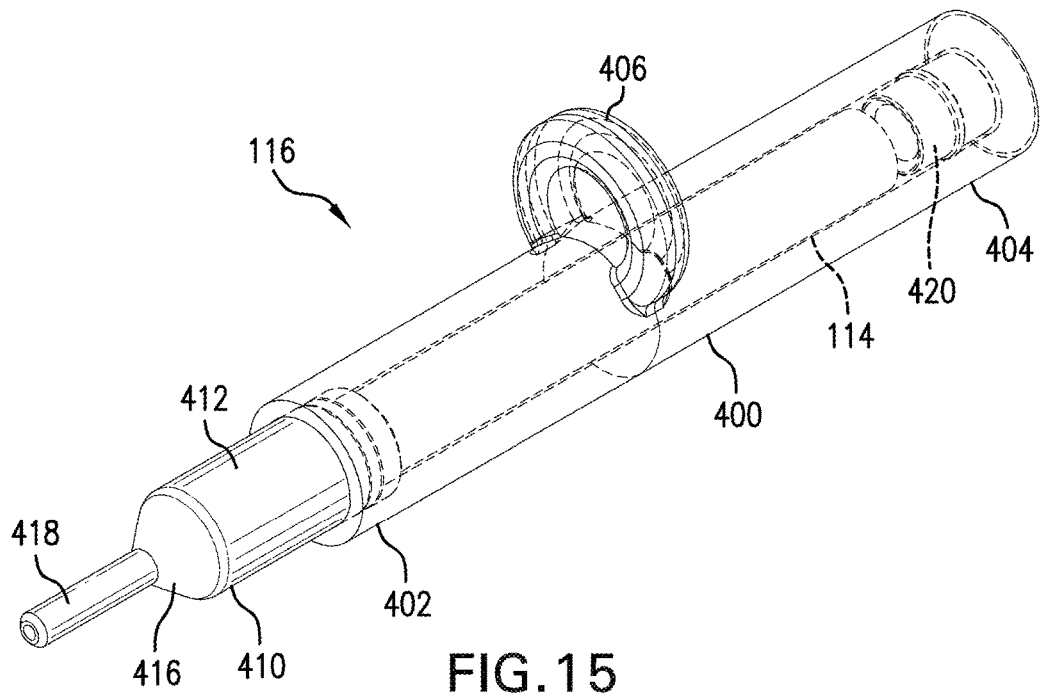
FIGS. 15 and 16 are perspective views of the heat pump cartridge housing the adhesive/filler stick.
Figure 16:
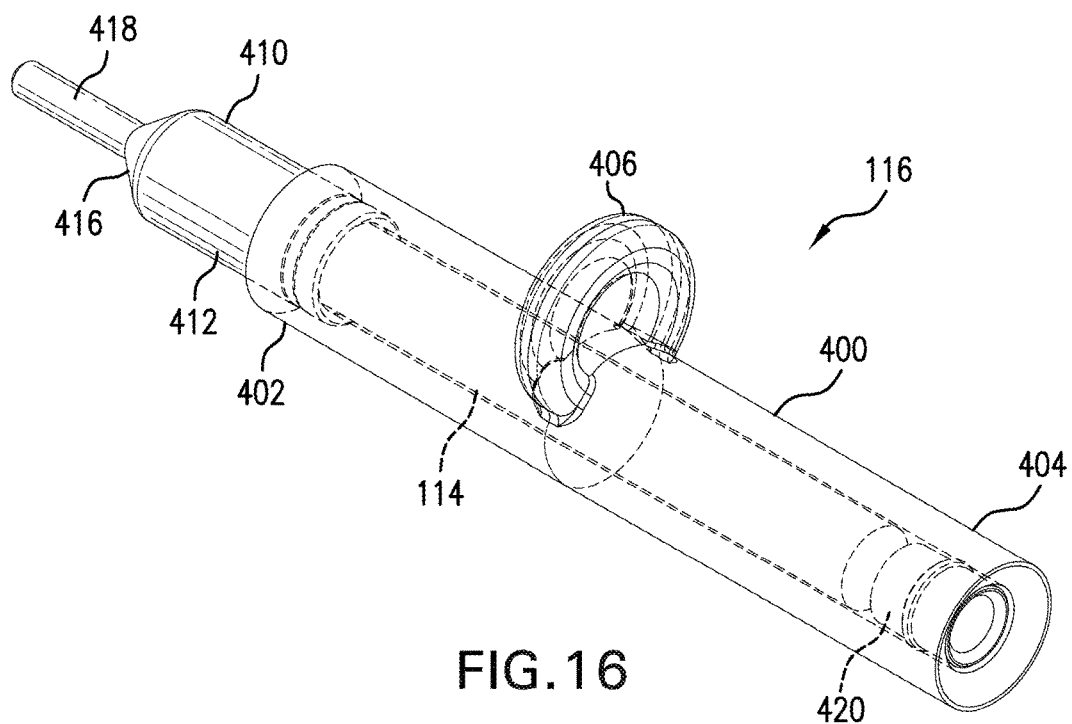
Figure 17:
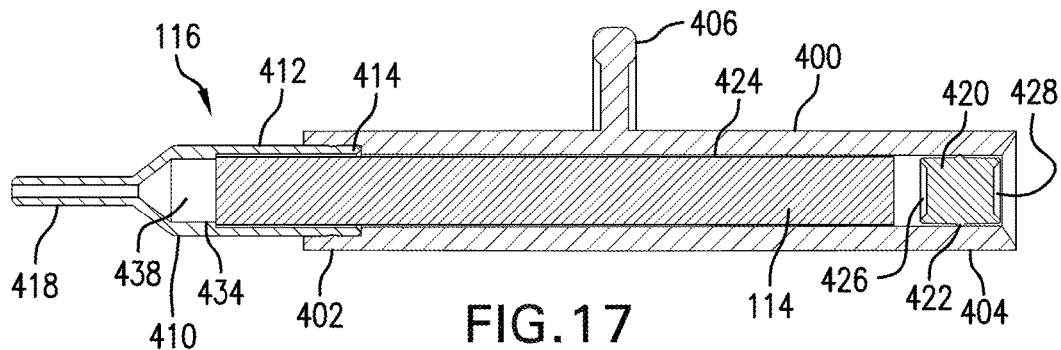
FIG. 17 is a cross-sectional view of the heat pump cartridge.
Figure 18:
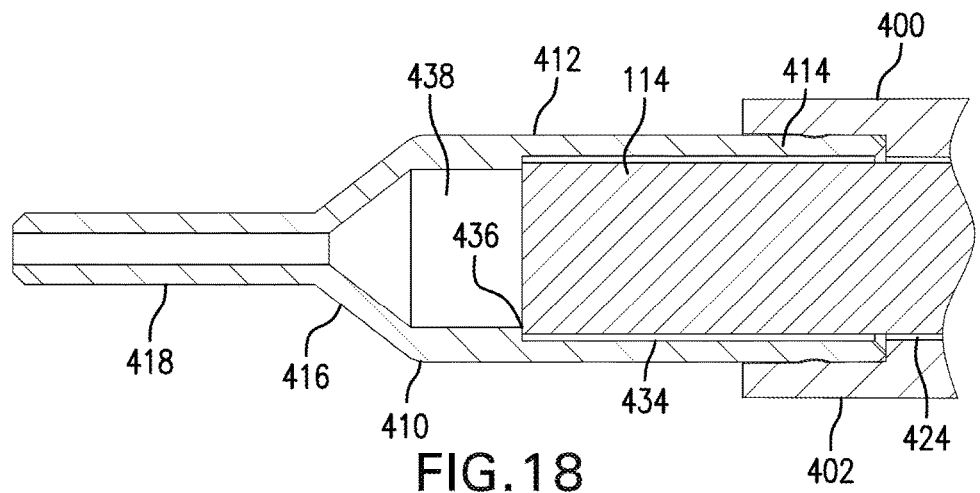
FIG. 18 is an enlarged view of FIG. 17.
Figure 19:
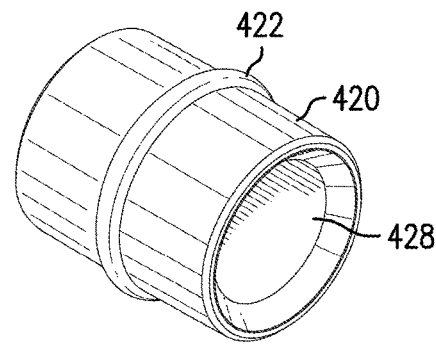
FIG. 19 is a perspective view of a cap for the heat pump cartridge.

It should, of course, be understood that the description and drawings herein are merely illustrative and that various modifications and changes can be made in the structures disclosed without departing from the present disclosure. Referring to FIGS. 1-5, a heat pump dispenser or gun 100 according to the present disclosure includes a robust housing 102 having a handle portion 104 and a barrel portion 106. The handle portion 104 includes a feeder section 110 and the barrel portion 106 includes a heater section 112 for heating and then dispensing a melted end of an adhesive/filler stick 114 provided in a removable cartridge 116 (the cartridge is best shown in FIGS. 15 and 16). The feeder section 110 includes a feeder mechanism 122 that may be selectively actuated by a dispensing trigger assembly 124 to advance the adhesive/filler stick 114 into the heater section 112. A battery pack 130 can also be housed in the handle portion 104. According to one aspect, the battery pack 130 is electrically connected to a power button 132 mounted to an upper part of the barrel portion 106. Indicator lights 126, 128 to denote, for example, power on/heating up and ready to dispense can be located adjacent the power button 132. The battery pack 130 can be accessible via a battery door 134 movably connected to the handle portion 104. It should be appreciated that the battery pack 130 provides operating power to the heater section 112 for heating the adhesive/filler stick 114 within the heater section.

Figure 6:
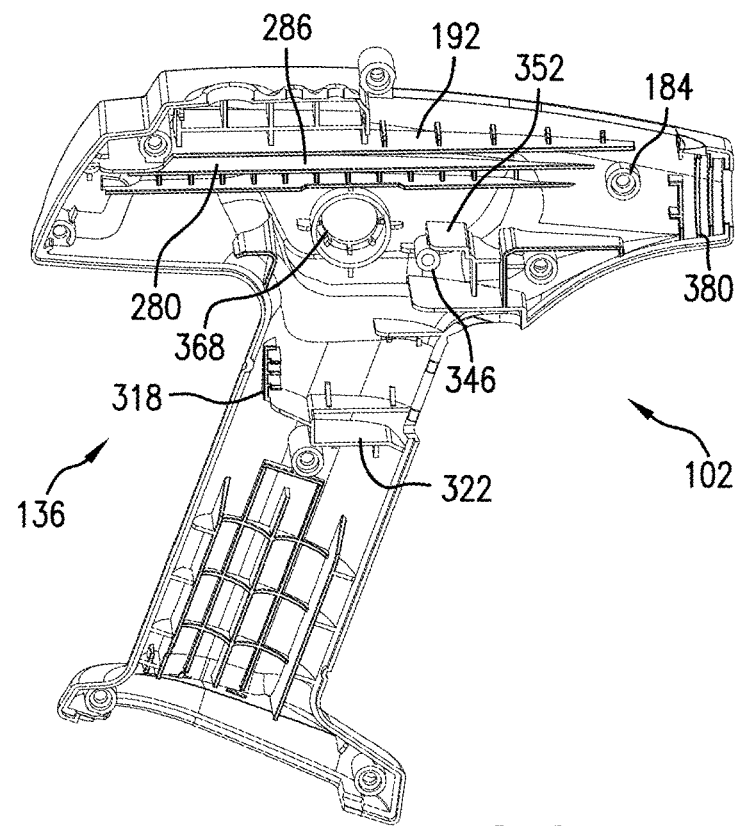
FIGS. 6 and 7 are perspective views of the respective first and second housing parts.

As depicted, the housing 102, which can be a two-piece housing having a first housing part 136 connected to a second housing part 138 (the features of the first and second housing parts will be discussed below), defines in the barrel portion 106 a cartridge receiving area 140. Located in the receiving area 140 is a support 142 adapted to receive the cartridge 116. As best shown in FIG. 20, the support 142 can include a generally U-shaped base wall 146 and flanges 150, 152 provided on opposite edge portions 156, 158 of the base wall 146. A first bridge 160 spans between the edge portions at a first end 162 of the base wall and together with the base wall 146 defines a first opening 166 for the cartridge 116. A second bridge 168 spans between the flanges 150, 152 at a second end 172 of the base wall 146 and defines a second opening 174 for the cartridge 116. A washer 176 can be provided at the first opening 166. A cutout 178 on the base wall 146 is sized to receive a part of the feeder mechanism 122. To secure the support 142 in the housing 102, the base wall 146 can include mounting bosses 180, 182 (see FIGS. 3 and 4) which align with mounting bosses 184, 186 on the first and second housing parts 136, 138 (see FIGS. 5 and 6). Fasteners, such as screws, threadingly engage the corresponding mounting bosses. Further, ledges 188, 190 can be provided beneath the flanges 150, 152 (see FIGS. 3 and 4), the ledges sitting on inner platforms 192, 194 on the respective first and second housing parts 136, 138 (see FIGS. 5 and 6). As shown in FIG. 4, a door 200 is pivotally connected to the upper part of the barrel portion 106 via a pin 202 secured to the first and second housing parts 136, 138. The door 200 is sized to cover the cartridge receiving area 140.

Figure 7:
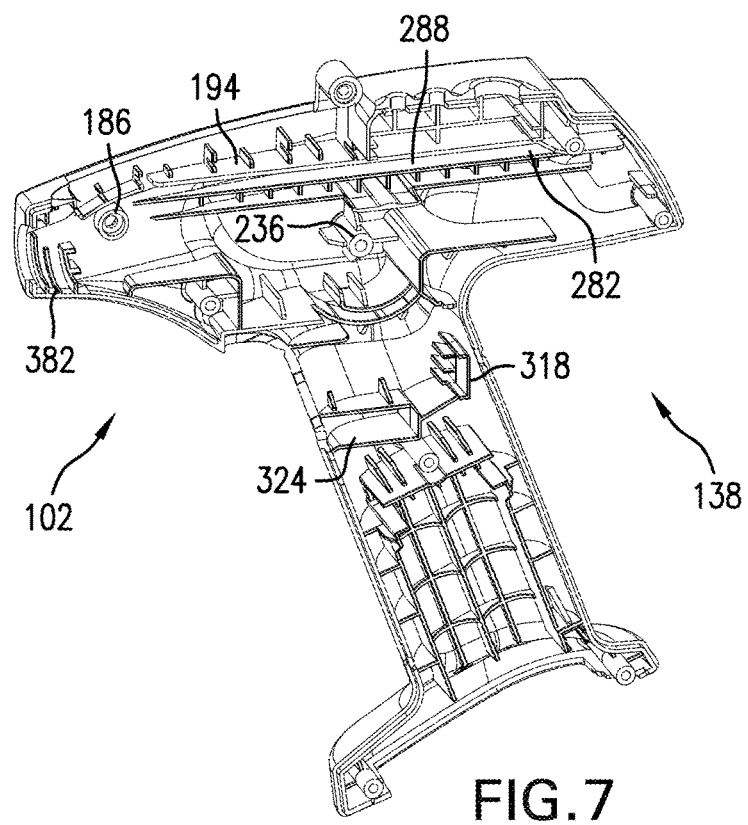

With reference to FIGS. 8-11, the exemplary feeder mechanism 122 generally includes a gear assembly 210, and according to one aspect, the gear assembly 210 has a drive gear or ram locking gear 212, a rack drive gear or main gear 214, and a linear gear or rack 218. According to the depicted embodiment, the rack 218 is formed as part of a plunger 220 which is movable into engagement with the adhesive/filler stick 114 housed in the cartridge 116. According to one aspect, the drive gear 212 is movably received on a stem 230 of the rack drive gear 214 (see FIGS. 13 and 14), and the stem 230 is appropriately shaped (for example, D-shaped in cross-section) to ensure co-rotation of the gears 212 and 214. The drive gear 212 is biased from the rack drive gear 214 via a biasing member (for example, a spring 232) mounted on the stem 230 and interposed between the drive gear 212 and the rack drive gear 214. The rack drive gear 214 can be mounted to the second housing part 138 via a pin 234 which can be secured in a corresponding mounting boss 236 on the second housing part 138. The plunger 220 can include a generally U-shaped base wall 266 and flanges 268, 270 are provided on opposite side portions 274, 276 of the base wall 266. The flanges 268, 270 are movably received in guide tracks 280, 282 provided on the respective first and second housing parts 136, 138 (see FIGS. 6 and 7). As depicted, the guide tracks 280, 282 can be at least partially formed by the platforms 192, 194 and respective shelves 286, 288 on the first and second housing parts 136, 138 that are located below the platforms 192, 194. An elongated stem 290 having a mounting portion 292 is located on the base wall 266. The mounting portion 292 is secured to an arcuate tab 298 spanning between the flanges 268, 270. The stem 290 is elevated from the base wall 266 which allows the stem to engage the adhesive/filler stick 114 housed in the cartridge 116 as the plunger 220 is moved selectively forward toward the heater section 112 by the trigger assembly 122.

Figure 12A:
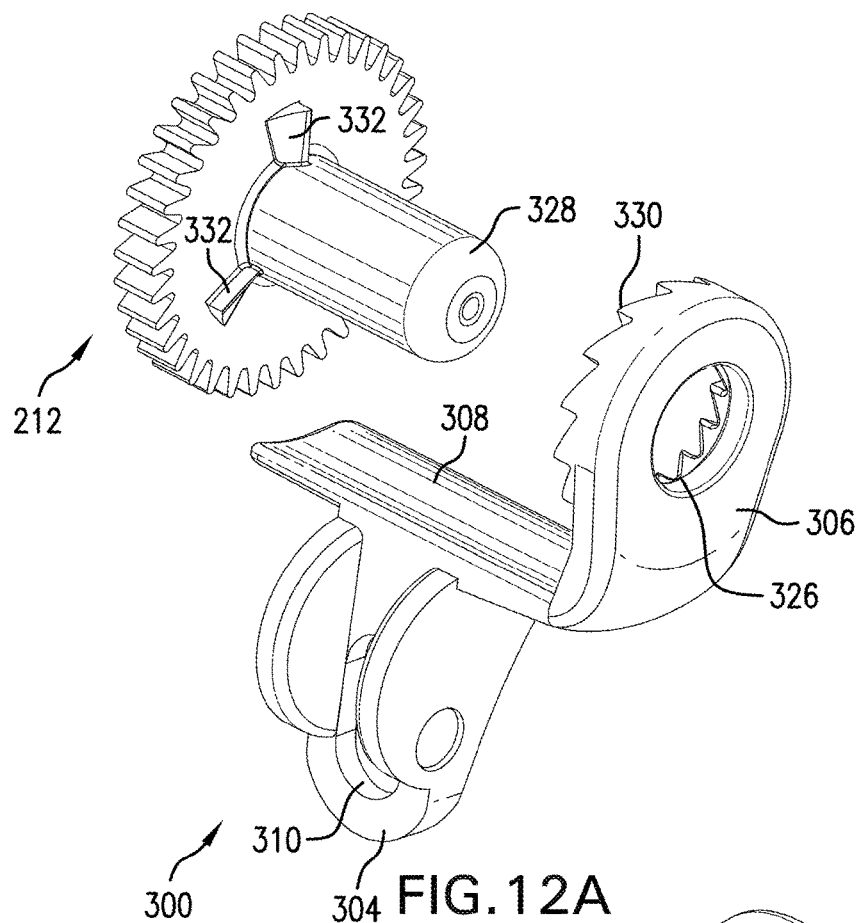
FIGS. 12A and 12B are perspective views of a drive gear of the feeder mechanism and a trigger of the trigger assembly.
Figure 12B:
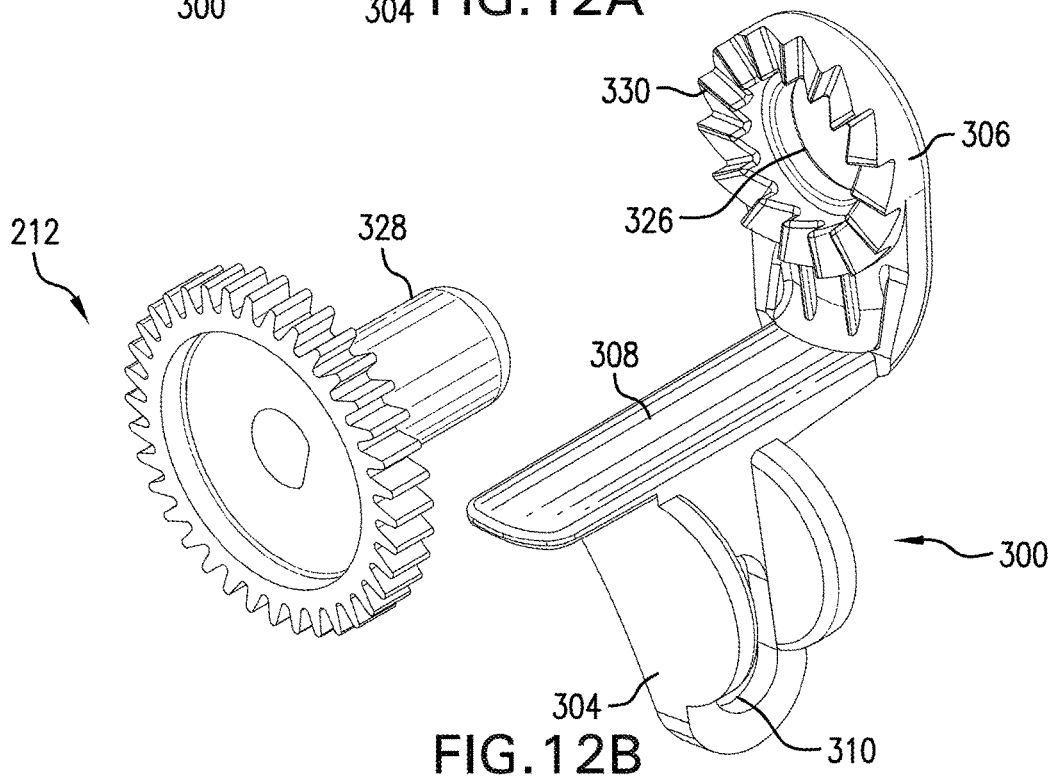

The exemplary trigger assembly 124 includes a trigger 300 and a trigger button 302. In the depicted aspect of FIGS. 12A and 12B, the trigger 300 includes a mounting portion 304 and a ratchet portion 306 extending outwardly from the mounting portion. The mounting portion 304 includes an opening 310 for receiving a post 312 extending from the trigger button 302. A biasing member, such as the depicted trigger spring 316, is mounted on the post 312 and engages a seat 318 defined by the first and second housing parts 136, 138 (see FIGS. 3-5). It should be appreciated that the trigger spring 316 biases the trigger button 302 outwardly from the handle portion 104. Further provided on the first and second housing parts 136, 138 are guides 322, 324 for slidably supporting the trigger button 302. As shown, the trigger 300 includes a seat 308 which in the assembled condition of the heat pump dispenser 100 extends beneath the rack drive gear 214. According to the depicted aspect, the mounting portion 304 depends from the seat 308 and the ratchet portion 306 extends upwardly from an end portion of the seat 308. The ratchet portion 306 includes an opening 326 sized to receive a post 328 extending outwardly from a side of the drive gear 212. The ratchet portion 306 further includes teeth 330 which selectively engage at least one projection 332 located on the side of the drive gear 212 to rotate the drive gear. In the depicted aspect of FIGS. 12A and 12B, the at least one projection 332 includes a plurality of projections 332 circumferentially spaced about the post 328 of the drive gear 212. The trigger assembly 124 further includes a lock or locking pawl 336 biased by a spring 340 and secured to the first housing part 136 via a pin 344. The pin is received in a boss 346 provided on the first housing part 136 (see FIG. 6), and axial movement of the lock 336 on the pin 344 can be prevented via a collar 348 located on the pin 344 (see FIGS. 13 and 14). Further, according to one aspect, the spring 340 is mounted on a projection 350 provided on the lock 336 and engages a seat 352 located on the first housing part 136. The lock 336 selectively engages the teeth of the drive gear 212 to prevent counter-rotation of the drive gear, which can maintain the forward position of the plunger 220.

In operation, depressing the trigger button 302 pivots or rotates the trigger 300 on the post 328. The movement of the trigger 300 causes the teeth 330 of the ratchet portion 306 to engage the projections 332 of the drive gear 212. And this engagement of the ratchet portion 306 with the drive gear 212 rotates the drive gear 212 which, in turn, rotates the rack drive gear 214. With the rack drive gear 214 meshingly engaged to the rack 222, the rotation of the rack drive gear 214 moves the plunger 220 within the barrel portion 106 of the housing 102. Again, the lock 336 prevents counter-rotation of the drive gear 212 upon release of the trigger button 302. And in the depicted embodiment, this counter-rotation is due to at least one biasing member (for example, the depicted pair of springs 360, 362) mounted to both the plunger 220 and the housing 102 and biasing the plunger 220 away from the cartridge 116. To release to feeder mechanism 122 and move the plunger 220 back to its initial position within the barrel portion 106, a cap 366 located on the post 328 of the drive gear, which projects out of an opening 368 in the first housing part 136 (see FIGS. 1 and 2), is pressed by the user. As shown in FIGS. 13 and 14, this moves the drive gear 212 toward the rack drive gear 214 compressing the spring 232. As the drive gear 212 is moved, the lock 336 disengages the teeth of the drive gear 212 allowing the counter-rotation of the drive gear 212 via the springs 360, 362. When the post 328 is released, the spring 232 biases the drive gear 212 back to its initial position with the lock in selective engagement with the drive gear 212.

Figure 1:
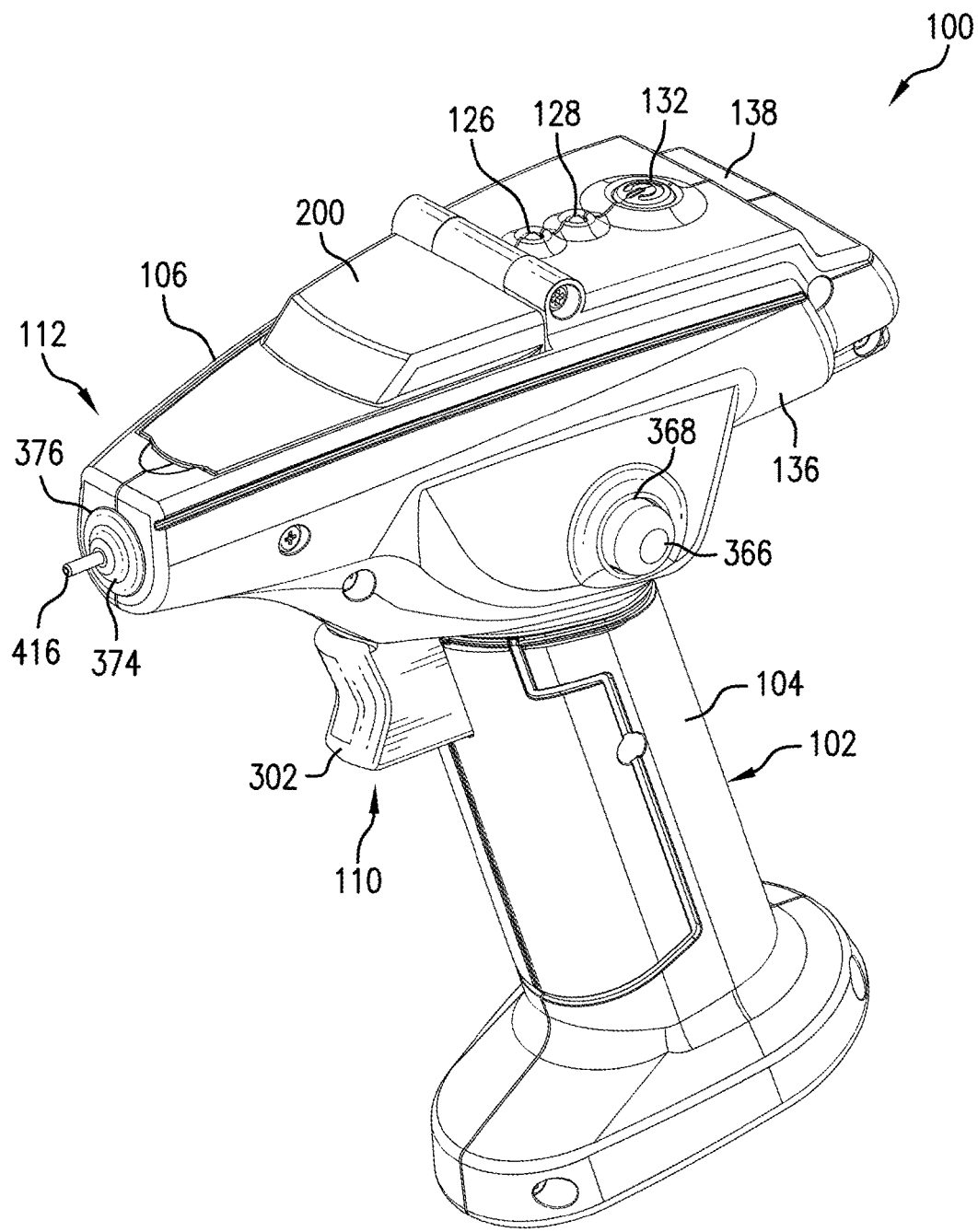
FIGS. 1 and 2 are perspective views of an exemplary heat pump dispenser according to the present disclosure.
Figure 2:
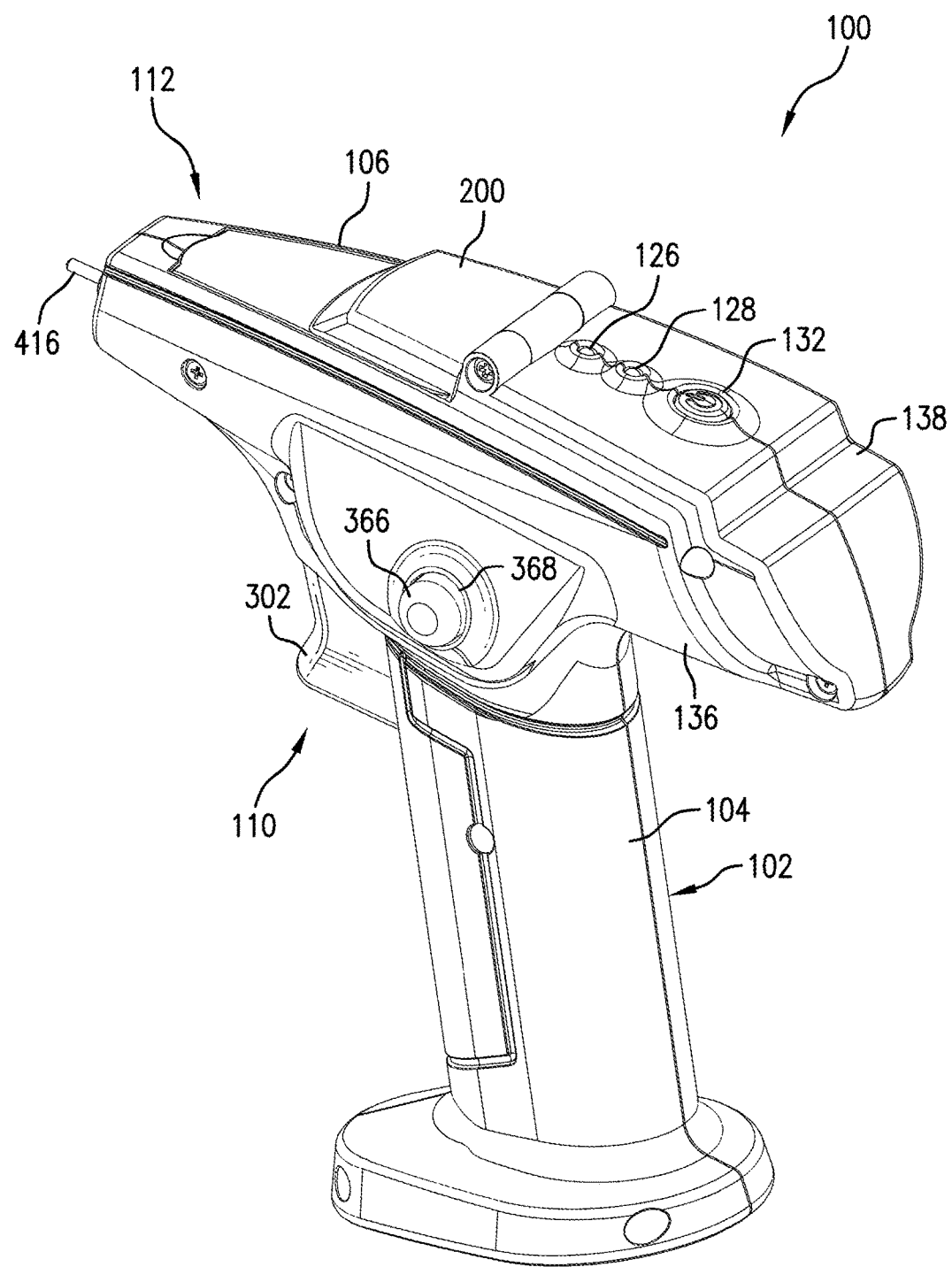
Figure 3:
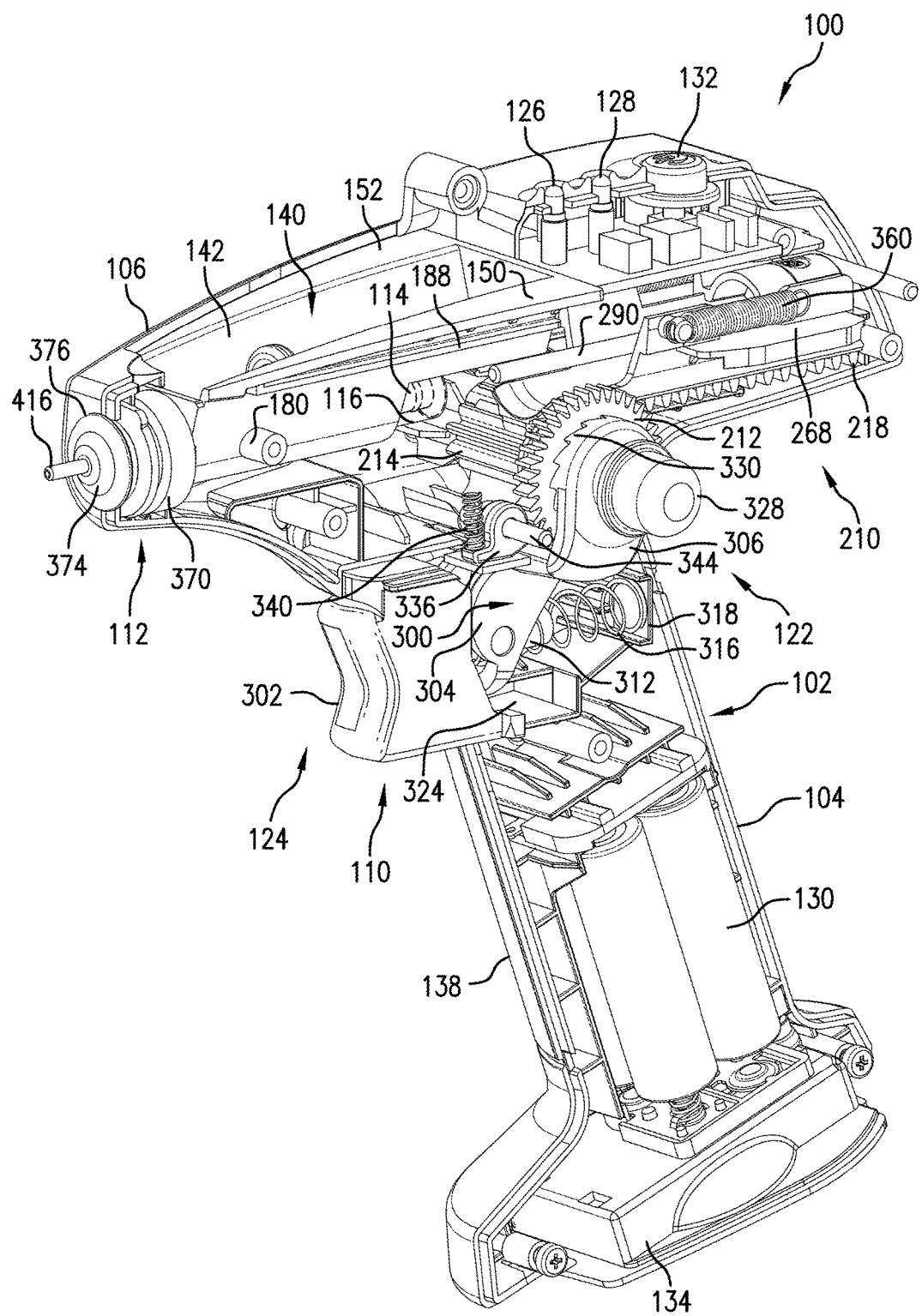
FIG. 3 is a perspective view of the heat pump dispenser with a first housing part removed.
Figure 4:
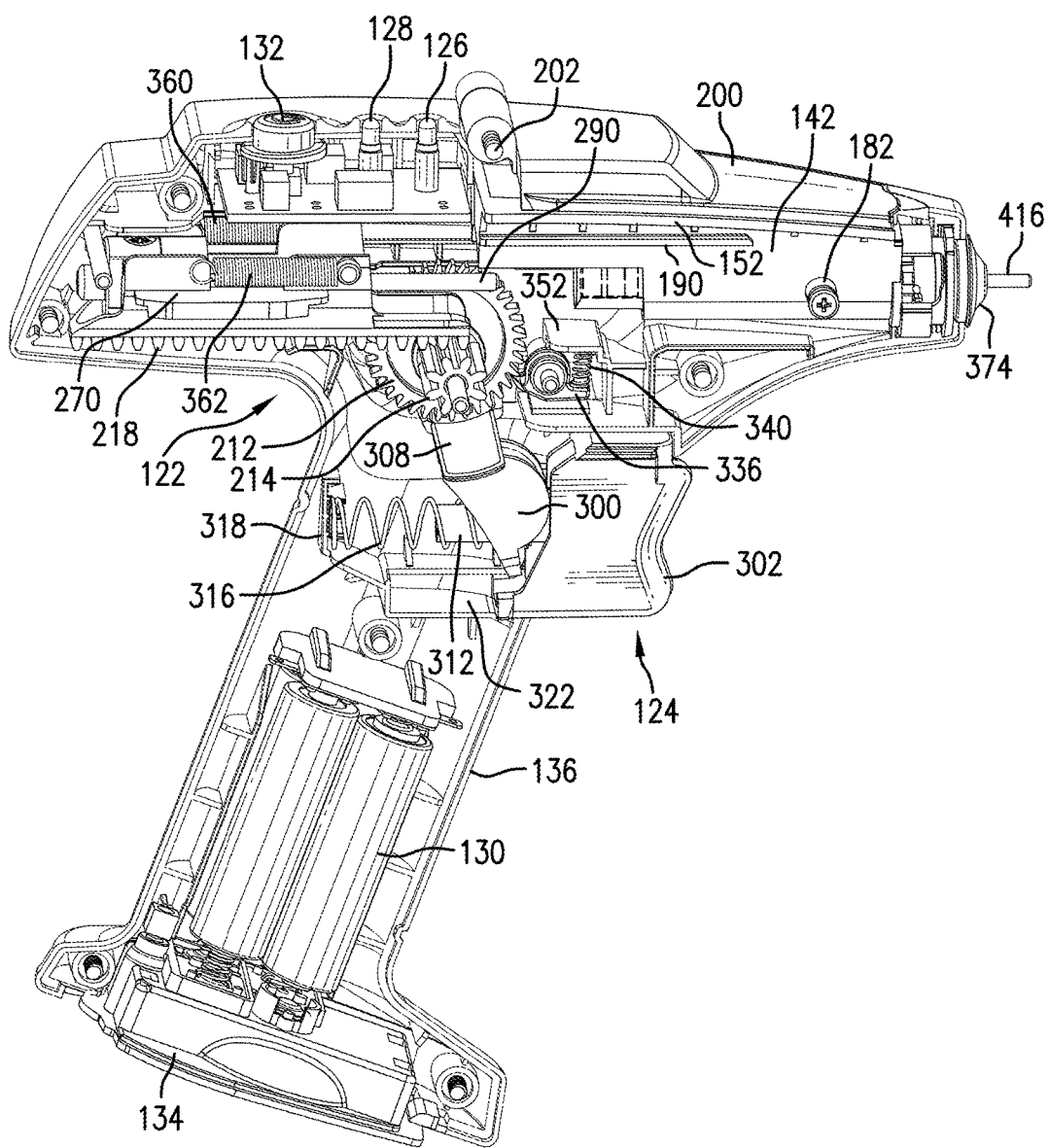
FIGS. 4 and 5 are side views of the heat pump dispenser with a second housing part removed.
Figure 5:
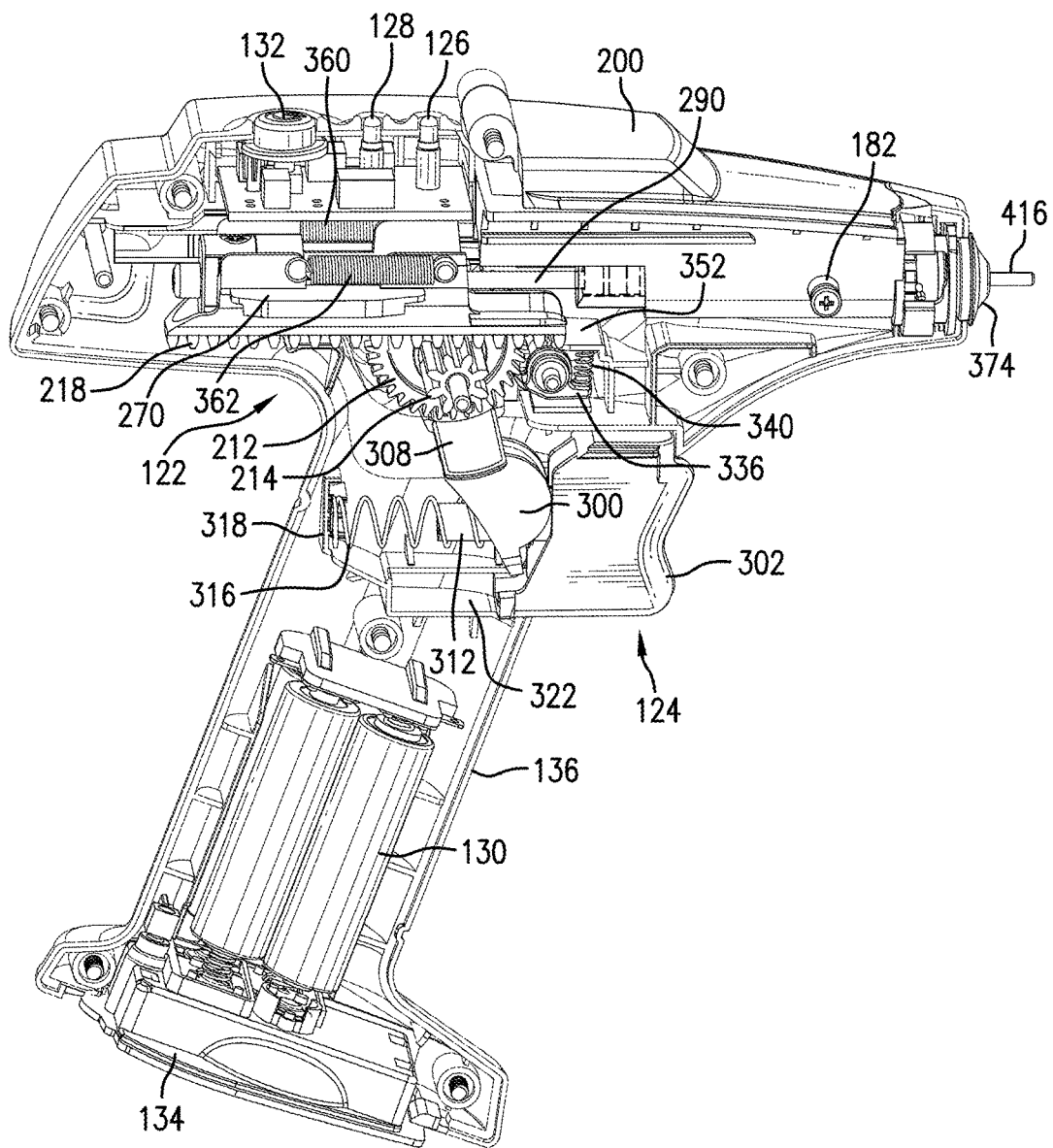

As depicted in FIGS. 3 and 20, the heater section 112 of the dispenser 108 includes first and second heat sink elements 370, 372. A cap 374 is mounted on the first heat sink element 370 and is received in a dispensing opening 376 defined by the barrel portion 106. The first and second heat sink elements 370, 372 can be mounted to the barrel portion 106 via mounting flanges 380, 382 on the respective first and second housing parts 136, 138 (see FIGS. 6 and 7). According to one aspect, the second heat sink element 372 can be at least partially received within the first heat sink element 370. The second heat sink element 372 is adapted to receive an end portion of the cartridge 116, and in the illustrated embodiment the second heat sink element is tubular shaped.

With reference to FIG. 15-20, according to one aspect the cartridge 116 includes a tubular shaped body 400 having first and second opposite end portions 402, 404. A tab or flange 406 for handling of the cartridge 116 extends outwardly from the body 400. In the depicted embodiment, the flange 406 is offset from the first and second end portions 402, 404, and can be located equidistant from the first and second end portions. The body 400 receives therein the adhesive/filler stick 114. The cartridge 116 further includes a conductor or heater tube 410 sized to be at least partially received in each of the first and second heat sink elements 370, 372. In the depicted embodiment, the heater tube 410 has a cylindrical shaped first part 412 with an end section 414 that is at least partially received in the first end portion 402 of the body 400 and a second part 416. The second part 416 of the heater tube 410 can be funnel-shaped and defines a nozzle 418. A cap 420 is received in the second end portion 404. According to one aspect, the cap 420 includes annular seal 422 engaging an inner surface 424 of the cartridge body 400, and opposite ends of the cap include recesses 426, 428 sized to receive an end of the stem 290 of the plunger 220. As shown, the recesses 426, 428 are similarly shaped which allows for ease of assembly for the cartridge 116. Further, according to the depicted embodiment, an inner surface 434 of the heater tube 410 defines a step 436 adapted to engage that portion of the adhesive/filler stick 114 located in the first part 412 of the heater tube 410. The step 436 together with the adhesive/filler stick 114 defines a reservoir 438 in the heater tube 410 forward of the adhesive/filler stick for receiving melted adhesive/filler.

Figure 23:
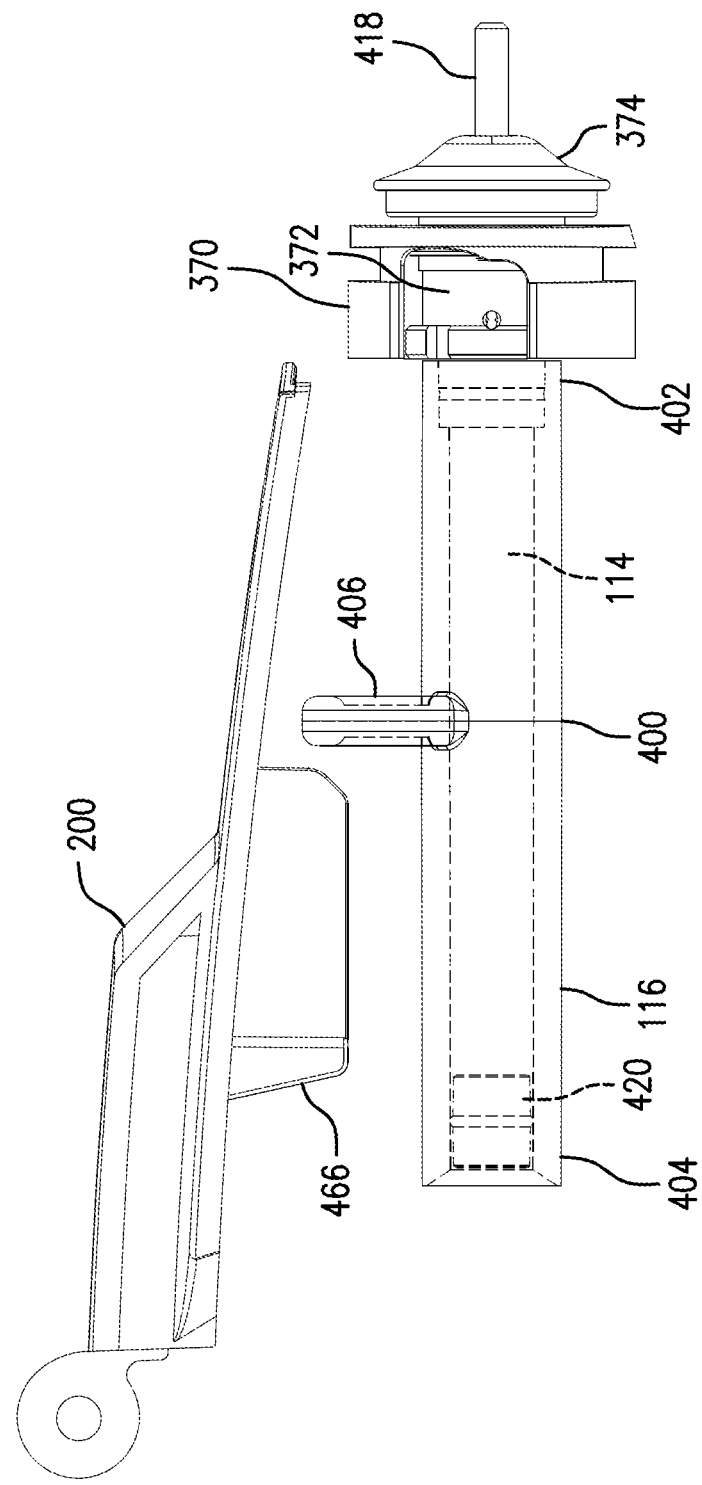
FIG. 23 is a perspective view of a door of the heat pump dispenser in relation to the heat pump cartridge.

As indicated previously, the cartridge 116 is received in the support 142, with the first part 412 of the heater tube 410 extending through the support first opening 166. The first part 412 is received in the second heat sink element 372 and the nozzle 418 of the second part 416 projects through an opening in the first heat sink element 370 and the cap 374. The cartridge body 400 can be formed of a plastic material (for example, polypropylene or polycarbonate) which allows a person to handle the exterior of the cartridge 116 (via the flange 406) when the cartridge is heated to operating temperatures. The heater tube 410 can be formed of a heat conductive metallic material (for example, an aluminum or aluminum alloy or a steel or steel alloy) and is heated in response to an electrical current generated from the battery pack 130. The heated heater tube 410 melts that portion of the adhesive/filler stick 114 located in the first part 412 of the heater tube. The portion of the adhesive/filler stick 114 is heated in the heater tube 410 until it melts and then is dispensed from the nozzle 418 via the stem 290 of the plunger 220 being pressed against the cap 420. Therefore, the heater tube 410 transfers heat into the cartridge body 400 and ensures that only the portion of the adhesive/filler stick 114 provided near the second part 416 is "melted" by the selective application of electrical power to the heater section 112. Further, as depicted in FIG. 23, the door 200 includes a depending flange 466. In a closed position of the door 200, the flange 466 is located in the support 142 rearward of the cartridge tab 406. When that portion of the adhesive/filler stick 114 located in the heater tube 410 is molten and ready to dispense, if contact is made with the nozzle 418, the molten portion can cause the cartridge 116 to retract inside the barrel portion 106 of the housing 102. However, interface between the cartridge tab 406 and the door flange 466 prevents retraction of the cartridge 116 within the housing 102.

Figure 22:
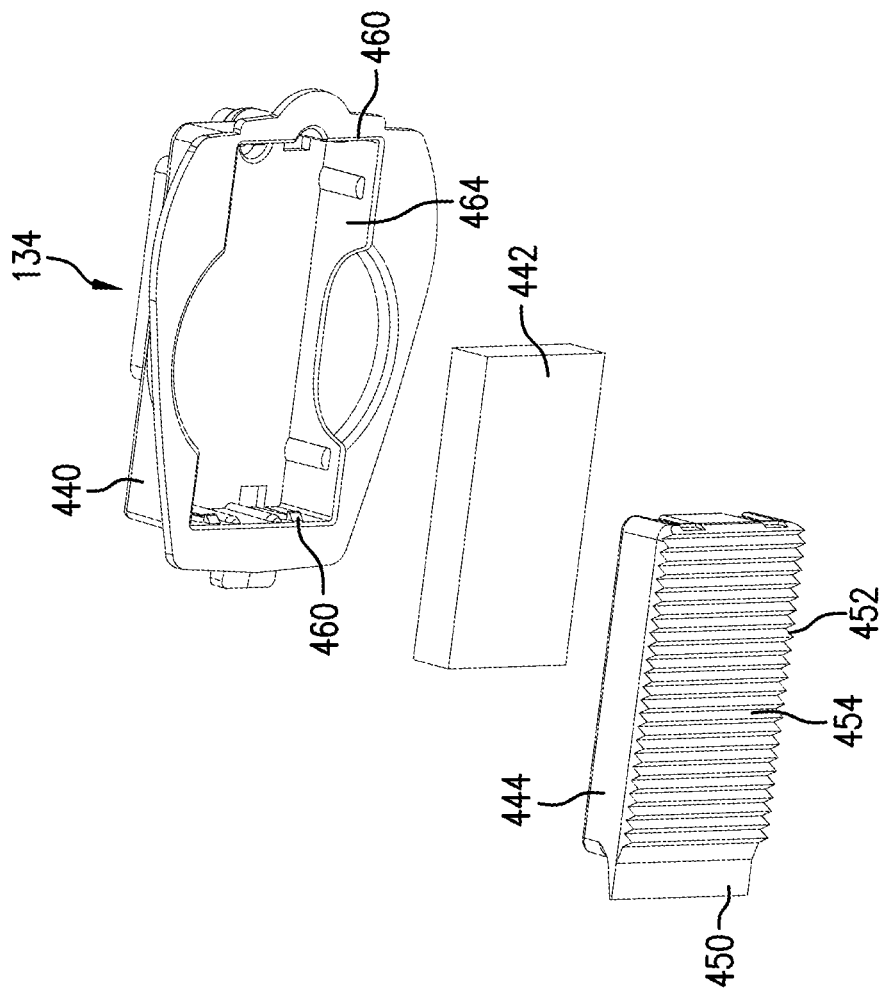
FIGS. 21 and 22 are perspective views of a supplemental housing, a scrapper pad and a scrapper tool of the heat pump dispenser.
Figure 21:
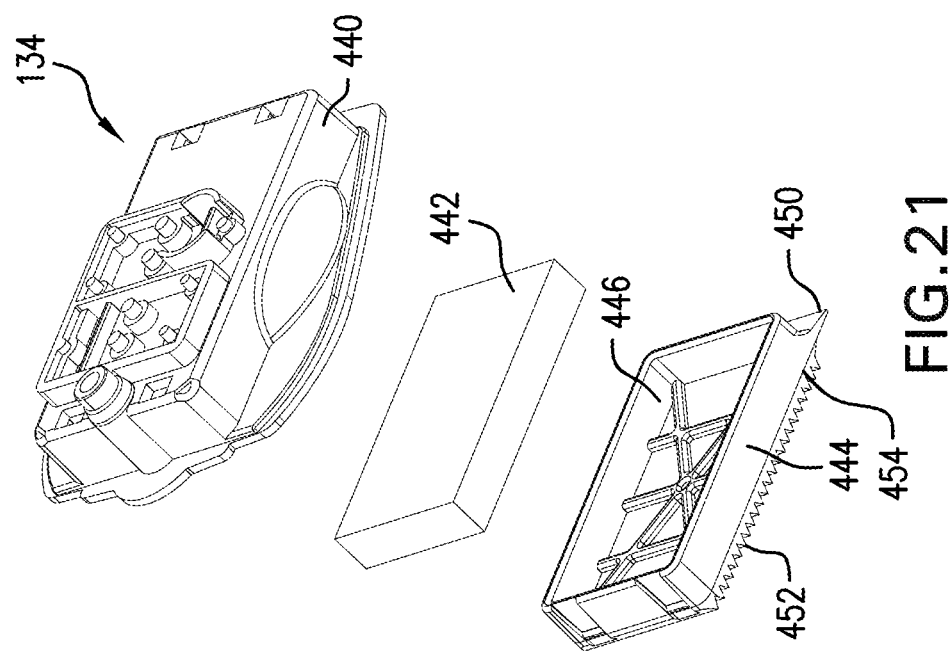

With reference to FIGS. 21 and 22, located beneath the battery pack 130 in the handle portion 104 is the battery door 134 which defines a supplemental housing 440 for releasably mounting a scrapper pad 442 and a separate scrapper tool 444. The scrapper tool 444, which can be rectangular shaped, is configured to releasably hold within a pocket 446 of the scrapper tool 444 the scrapper pad 442. The scrapper tool 444 can include a wedge shaped end portion 450 and serrations 452 on its bottom surface 454 to aid in the removal of excess adhesive/filler from an associated surface. To secure the scrapper tool 444 (together with the scrapper pad 442) within the supplemental housing 440, engaging tabs 460 can be provided on an inner surface 464 of the supplemental housing 440; however, alternative manners for securing the scrapper tool 444 are contemplated.

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A heat pump dispenser comprising:
 a housing having a handle portion and a barrel portion;
 a feeder section coupled to the handle portion, the feeder section includes a feeder mechanism and a dispensing trigger assembly operably coupled to the feeder mechanism, the feeder mechanism includes a gear assembly having a drive gear operably engaged to a plunger housed in the barrel portion, the trigger assembly includes a trigger having a ratchet portion, the ratchet portion selectively engages and rotates the drive gear to move the plunger toward a dispensing opening provided in the barrel portion and into engagement with an adhesive/filler stick, wherein the feeder mechanism is selectively actuated by the dispensing trigger assembly to advance the adhesive/filler stick into a heater section of the barrel portion, wherein the gear assembly further includes a rack drive gear and a linear gear provided as part of the plunger, the rack drive gear engaged to both the drive gear and the linear gear, and further including a biasing member that biases the drive gear towards the ratchet portion.

2. The heat pump dispenser of claim 1, wherein the drive gear is movably received on a stem of the rack drive gear, and the biasing member is mounted on the stem and interposed between the drive gear and the rack drive gear to bias the drive gear toward the ratchet portion.

3. The heat pump dispenser of claim 2, wherein the trigger assembly includes a locking pawl selectively engaging the drive gear to prevent counter-rotation of the drive gear.

4. The heat pump dispenser of claim 3, wherein the drive gear is adapted to move toward the rack drive gear to disengage the locking pawl from the drive gear.

5. The heat pump dispenser of claim 3, wherein at least one biasing member is mounted to the plunger and the housing to bias the plunger away from the dispensing opening.

6. The heat pump dispenser of claim 1, wherein an outer side of the drive gear includes at least one projection, and the ratchet portion includes teeth which selectively engage the at least one projection to rotate the drive gear.

7. The heat pump dispenser of claim 6, wherein the trigger is pivotally mounted on the drive gear, the drive gear includes a post extending from the outer side, and the ratchet portion includes an opening sized to receive the post.

8. The heat pump dispenser of claim 7, wherein the at least one projection includes a plurality of projections circumferentially spaced about the post of the drive gear.

9. The heat pump dispenser of claim 1, wherein trigger assembly includes a trigger button movably mounted to the handle portion, the trigger button includes a post projecting into the handle portion, the trigger includes a mounting portion having an opening for receiving the post of the trigger button, and a biasing member is mounted on the post and engages a seat defined by the handle portion.

10. The heat pump dispenser of claim 1, wherein the heater section includes first and second heat sink elements mounted within the dispensing opening.

11. The heat pump dispenser of claim 10, wherein the adhesive/filler stick is received in a cartridge, the cartridge includes a heater tube sized to be at least partially received in each of the first and second heat sinks, the heater tube formed of a heat conductive material, wherein an inner surface of the heater tube defines a step adapted to engage the adhesive/filler stick, the step together with the adhesive/filler stick defines a reservoir in the heater tube forward of the adhesive/filler stick for receiving melted adhesive/filler.

12. The heat pump dispenser of claim 1, wherein at least one tool is housed in the handle portion.

13. A heat pump dispenser comprising:
a housing having a handle portion and a barrel portion;
a feeder section coupled to the handle portion, the feeder section includes a feeder mechanism and a dispensing trigger assembly operably coupled to the feeder mechanism, the feeder mechanism includes a gear assembly having a drive gear operably engaged to a linear gear provided as part of a plunger housed in the barrel portion, the trigger assembly includes a trigger having a ratchet portion and the drive gear is biased toward the ratchet portion,
an outer side of the drive gear, which is normal to a rotational axis of the drive gear, includes at least one projection, the ratchet portion includes teeth which selectively engage the at least one projection to rotate the drive gear which moves the plunger toward a dispensing opening provided in the barrel portion and into engagement with an adhesive/filler stick, wherein the feeder mechanism is selectively actuated by the dispensing trigger assembly to advance the adhesive/filler stick into a heater section of the barrel portion.

14. The heat pump dispenser of claim 13, wherein the gear assembly further includes a rack drive gear engaged to both the drive gear and the linear gear.

15. The heat pump dispenser of claim 14, wherein the drive gear is movably received on a stem of the rack drive gear, and further including a biasing member mounted on the stem and interposed between the drive gear and the rack drive gear to bias the drive gear toward the ratchet portion.

16. The heat pump dispenser of claim 14, wherein the trigger assembly includes a locking pawl selectively engaging the drive gear to prevent counter-rotation of the drive gear and maintain a position of the plunger in the barrel portion, the drive gear is adapted to move toward the rack drive gear to disengage the locking pawl from the drive gear.

17. The heat pump dispenser of claim 13, wherein the trigger is pivotally mounted to the drive gear.

* * * * *